UNITED STATES PATENT OFFICE.

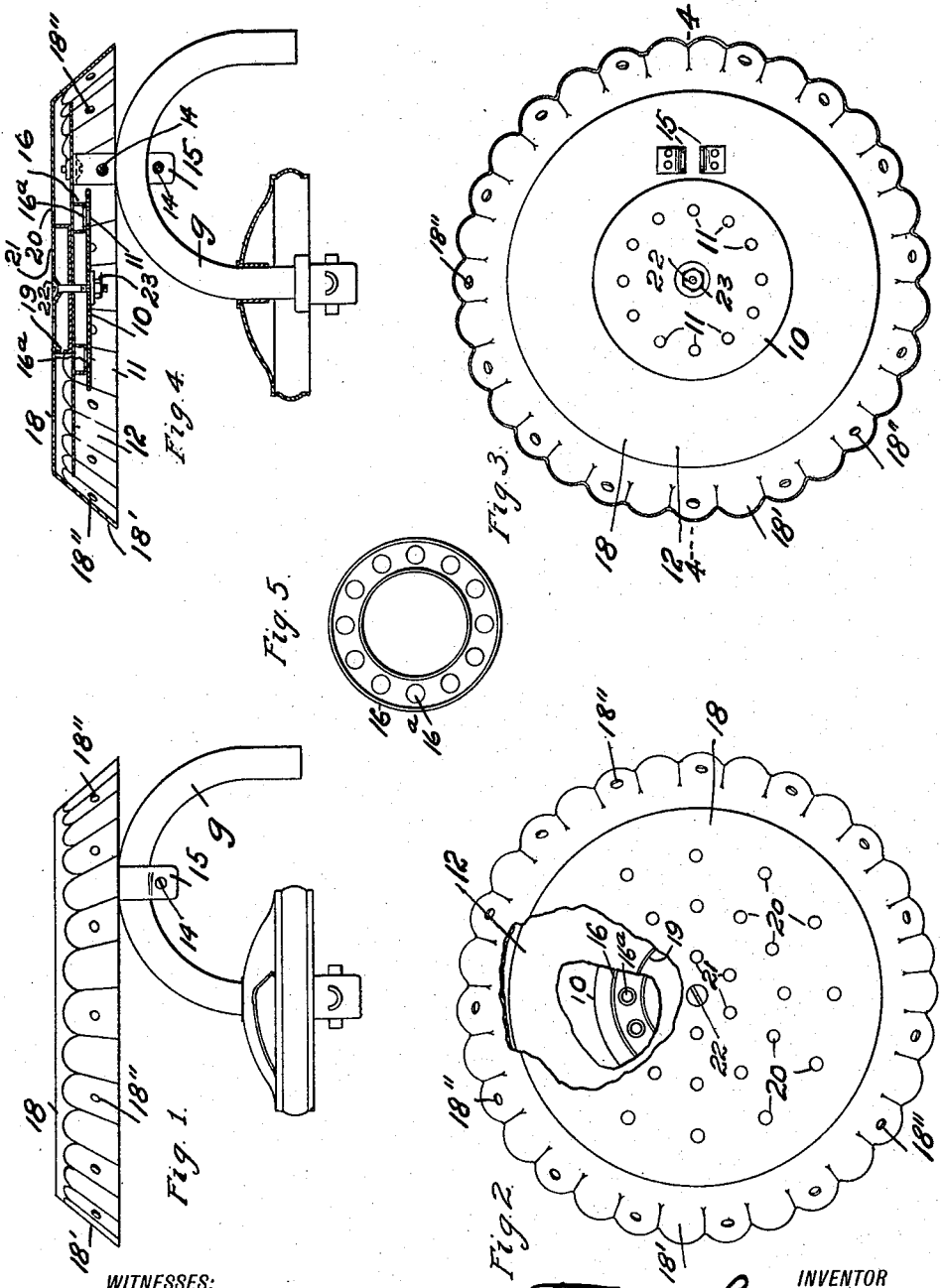

FRANK LEACH, OF DETROIT, MICHIGAN.

HEATING ATTACHMENT FOR BURNERS.

1,217,464.        Specification of Letters Patent.      Patented Feb. 27, 1917.

Application filed September 13, 1916. Serial No. 119,959.

*To all whom it may concern:*

Be it known that I, FRANK LEACH, a subject of the King of Great Britain, residing at Detroit, county of Wayne, State of Michigan, have invented a certain new and useful Improvement in Heating Attachments for Burners, and declare the following to be a full, clear, and exact description of the same, such as will enable others skilled in the art to which it pertains to make and use the same, reference being had to the accompanying drawings, which form a part of this specification.

This invention relates to heating devices to be used in connection with gas burners, not only for the purpose of deflecting the hot air arising from the burner and to therefore prevent discoloration of the ceiling, but furthermore to distribute such heat radially from the device, so that the heat will thus be used for warming the atmosphere of the room.

The invention has for one of its objects the provision of an improved device of this character which may be attached to or removed from any burner of ordinary construction.

The invention has furthermore for its object the improved construction of the device, such construction permitting of any desired finish upon the outer plate or cover, either through plating, painting, or lacquering, without danger of discoloration.

Other advantages and improvements will hereinafter appear.

The invention is illustrated in the accompanying drawings, in which similar characters denote similar parts and in which—

Figure 1 represents a side view of my improved device applied to a gas burner of the drop-mantle type.

Fig. 2 is a plan view thereof, with parts broken away.

Fig. 3 shows an inverted plan view of the same.

Fig. 4 represents a section on line 4—4 of Fig. 3.

Fig. 5 illustrates in detail one member used in the device.

The heating attachment may be applied to gas burners of different kinds or to oil burning lamps, the drawings however show the device applied to a burner of the inverted gas mantle type, this burner comprising a gooseneck $g$, to which the holding fixture of the device is secured.

By referring to Figs. 3 and 4, it will be seen that my improved heater comprises a distributing plate 10 having a plurality of perforations 11 through which the heat generated by the burner may pass. Disposed above this distributing plate, and spaced therefrom, is a baffle plate 12 which carries a clip 15 adapted to straddle the gooseneck $g$ and to be clamped thereto, as for instance by screws 14.

A spacer plate 16 (see also Fig. 5) having perforations $16^a$, is interposed between the distributing plate and the baffle 12, the heat waves passing through both sets of perforations 11 and $16^a$ against the under side of the baffle plate whereby the heat is deflected radially outward toward another series of perforations 18″ provided in the depending flange 18′ of the main or crown plate 18 which is spaced from the baffle by a spacer member 19, as shown. Any heat which may find its way into this space between the baffle and the crown is permitted to escape through perforations 20 provided in the top plate of the crown. Likewise any heat which may be established in the interior of the spacer cup 19 is permitted to escape through perforations 21, so that the temperature of the crown will be maintained at a comparatively low degree.

The several parts above described are held together by a bolt 22 projecting through the center portions of the same respectively, and carrying at its under side a nut 23 screw-threaded therewith.

Changes may be made in the particular construction and assemblage of the several parts, without departing from the spirit of the invention.

Having thus described my invention, what I claim is:—

A heating attachment for gas burners comprising a distributing plate having a series of perforations, a baffle in superposed relation thereto, a spacer between said distributing plate and the baffle and having perforations registering with the perforations of the distributing plate, a crown plate having a depending flange provided with perforations below said baffle, means for holding the several parts together, and means carried by said baffle for holding the device on a gas burner.

In testimony whereof, I sign this specification in the presence of two witnesses.

FRANK LEACH.

Witnesses:
S. E. THOMAS,
N. HURLEY.

Copies of this patent may be obtained for five cents each, by addressing the "Commissioner of Patents, Washington, D. C."